United States Patent
Frank et al.

(10) Patent No.: US 12,368,779 B2
(45) Date of Patent: Jul. 22, 2025

(54) METHOD OF COMMUNICATING WITH A MICROSERVICE IN AN INDUSTRIAL FACILITY

(71) Applicant: SIEMENS AKTIENGESELLSCHAFT, Munich (DE)

(72) Inventors: Johannes Frank, Meerbusch (DE); Ingo Thon, Grasbrunn (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/292,997

(22) PCT Filed: Jul. 18, 2022

(86) PCT No.: PCT/EP2022/070034
§ 371 (c)(1),
(2) Date: Jan. 29, 2024

(87) PCT Pub. No.: WO2023/006469
PCT Pub. Date: Feb. 2, 2023

(65) Prior Publication Data
US 2025/0080609 A1    Mar. 6, 2025

(30) Foreign Application Priority Data
Jul. 30, 2021    (EP) .................... 21188710

(51) Int. Cl.
*G06F 15/173* (2006.01)
*H04L 67/12* (2022.01)
*H04L 67/565* (2022.01)

(52) U.S. Cl.
CPC ............ *H04L 67/12* (2013.01); *H04L 67/565* (2022.05)

(58) Field of Classification Search
CPC ..................... H04L 67/12; H04L 67/565
(Continued)

(56) References Cited

U.S. PATENT DOCUMENTS 10,404,838 B2 *   9/2019   Ahuja ................. H04L 63/0428
10,482,063 B2 *  11/2019   Maturana ............ G05B 19/418
(Continued)

FOREIGN PATENT DOCUMENTS

EP    3444689 A1    2/2019

OTHER PUBLICATIONS

PCT International Preliminary Report on Patentability mailed Aug. 1, 2023, corresponding to PCT International Application No. PCT/EP2022/070034.

*Primary Examiner* — Alicia Baturay
(74) *Attorney, Agent, or Firm* — Lempia Summerfield Katz LLC

(57) ABSTRACT

A method of communicating with a microservice in an industrial facility. The method is implemented by a controller and includes obtaining one or more data structure types, wherein the data structure types are generated based on an API definition associated with the microservice, generating one or more variables based on the obtained data structure types, wherein the variables are associated with one or more function blocks of the controller, and transmitting data associated with the variables to the microservice via a proxy component. The controller transmits the data associated with the variables in a serialized binary format associated with the variables to the proxy component. The proxy component is configured to translate to translate the data from the serialized binary data to a first serialization format and transmit the data in the first serialization format to the microservice.

7 Claims, 3 Drawing Sheets

(58) Field of Classification Search
USPC .......................................................... 709/224
See application file for complete search history.

(56) References Cited

U.S. PATENT DOCUMENTS

| | | | | |
|---|---|---|---|---|
| 10,698,791 | B2* | 6/2020 | Tunnicliffe | G06F 11/004 |
| 10,740,293 | B2* | 8/2020 | Maturana | G05B 19/418 |
| 10,762,513 | B2* | 9/2020 | Southall | G06Q 10/10 |
| 10,915,377 | B2* | 2/2021 | Bailey | G06F 9/541 |
| 11,012,426 | B2* | 5/2021 | Todd | G06F 21/33 |
| 11,194,593 | B2* | 12/2021 | Männer | G06F 9/445 |
| 11,455,080 | B2* | 9/2022 | Southall | G06Q 10/063 |
| 12,001,183 | B2* | 6/2024 | Foltin | G06F 9/544 |
| 2017/0187785 | A1* | 6/2017 | Johnson | H04L 51/42 |
| 2020/0067789 | A1* | 2/2020 | Khuti | H04L 41/5009 |
| 2020/0227178 | A1 | 7/2020 | Lombardi | |
| 2021/0110319 | A1* | 4/2021 | Gourisetti | G06Q 10/0637 |
| 2022/0350311 | A1* | 11/2022 | Volkening | H04L 67/10 |
| 2024/0385592 | A1* | 11/2024 | Waltl | G05B 19/4155 |
| 2024/0396970 | A1* | 11/2024 | Zhou | G05B 19/054 |

* cited by examiner

FIG 3

```
openapi: 3.0.2 paths:
    /arithmetics
        post:
            tags:
                - arithmetics
            summary: Arithmetics
            description: Perform arithmetic operation on two numbers
            operationId: mlapi.handlers.arithmetica
            requestBody:
                required: true
                content:
                    application/json:
                        schema:
                            type: object
                            required
                                - x
                                - y
                            properties
                                x:
                                    type: number
                                y:
                                    type: number
                    responses
                        "200":
                            description: Result of the arithmetic operation.
                            content:
                                application/json:
                                    schema:
                                        type: object
                                        required:
                                            - result
                                        properties:
                                            result:
                                                type: number
```

300

METHOD OF COMMUNICATING WITH A MICROSERVICE IN AN INDUSTRIAL FACILITY

CROSS REFERENCE TO RELATED APPLICATIONS

The present patent document is a § 371 nationalization of PCT Application Serial Number PCT/EP2022/070034, filed Jul. 18, 2022, designating the United States which is hereby incorporated in its entirety by reference. This patent document also claims the benefit of EP21188710.4 filed on Jul. 30, 2021, which is hereby incorporated in its entirety by reference.

FIELD

Embodiments relate to communication amongst devices in industrial facilities and in relation to communication between programmable logic controllers and microservices in industrial facilities.

BACKGROUND

A recent trend of industry 4.0 is the IT/OT convergence. The current disclosure relates to integration of generic IT application—typically microservices—into OT application in the form of PLC programs. Such microservices may expose a wide variety of functions, e.g., AI application, communication with the Enterprise Resource Planning System, Database Applications, etc. A central component of an automation system is the Programmable Logic Controller (PLC). PLCs are real-time capable devices that control critical applications in industries like factory automation. The PLC processes the inputs from the system and generates outputs to control it, often with real-time constraints. They are designed to run their program deterministically in order meet the real-time constraints of the processes that they control. Therefore, compute-intense functionalities (e.g. data analytics, execution of AI models) are separated from the PLC program and run on other devices, e.g. IPCs (Industrial PCs) or within cloud environments. The PLC program only invokes those functionalities and receives the result upon completion without blocking the control program.

Most modern software architectures use the microservice architecture paradigm. This is a variant of the service-oriented architecture that arranges an application as a collection of loosely coupled services. The communication between a service-consumer (client) and a microservice as well as between microservices is realized via an API (application programming interface) that is offered by the microservice to invoke remote procedures (in general called RPC, remote procedure calls) within the microservice in order to transfer data, but also to invoke functionalities (e.g., business rules, functions) that return a result. The most used protocol is HTTP in order to build APIs using approaches like REST or OpenAPI. Another common communication approach is the usage of messaging with a message-oriented middleware e.g., by using publish/subscribe mechanisms. Participants (e.g., clients, microservices) may publish a topic and send data to it via messages, and other participants may subscribe to those topics and receive the messages. A common protocol for M2M/IoT messaging is MQTT.

Most conventional PLCs support communication based on TCP/IP and accordingly, it is challenging to efficiently integrate the communication between PLC program and microservices. The conventional approach still suffers from inflexibility and require manual integration efforts by automation engineers to enable communication between PLCs and microservices. Particularly, all approaches utilized in modern software architecture require data structures to be serialized by the sender and de-serialized into the original data structure by the receiver. Most commonly, data is expected to be serialized as JSON (JavaScript Object Notation) string. However, the current capabilities of PLC programming languages (Function Block Diagram, Ladder Logic, SCL) do not support mechanism like reflection and therefore are not suitable for generic JSON serialization/deserialization.

Accordingly, often automation engineers manually write code that parses PLC data structures into the pre-defined serialization format that is expected by the receiving end and de-serialize the received data back into PLC data structures. The manual integration effort increases with every new API call that is used or message to be send or received. Implementation of such custom code is often error-prone and has high implementation costs that increase rapidly along the integration of additional service calls in the PLC program.

In disclosure EP 3 444 689 A1, a manifest generation system is disclosed, that generates a system model that acts as an information generator for a cloud based computing architecture. It describes a cloud agent device that is capable of transforming industrial data from a first format to a second format.

BRIEF SUMMARY AND DESCRIPTION

The scope of the embodiments is defined solely by the appended claims and is not affected to any degree by the statements within this summary. The present embodiments may obviate one or more of the drawbacks or limitations in the related art.

Embodiments provide a method of communicating with a microservice in an industrial facility. The method is implemented by a controller and includes obtaining one or more data structure types, wherein the one or more data structure types are generated based on an API definition associated with the microservice, generating one or more variables based on the obtained data structure types, wherein the one or more variables are associated with one or more function blocks of the controller, and transmitting data associated with the one or more variables to the microservice via a proxy component. The controller transmits the data associated with the one or more variables in a serialized binary format associated with the one or more variables to the proxy component. The proxy component is configured to translate to translate the data from the serialized binary data to a first serialization format and transmit the data in the first serialization format to the microservice.

Embodiments provide a method of communication between the controller (including the programmable logic controller) and the microservice. The communication is enabled using a proxy component that is able to translate the data formats of the data exchanged between the controller and the microservice such that the data is the data format that may be understood by the corresponding controller or the microservice. Such translation is enabled via the API definition of the microservice that is used by the controller to generate variables. Accordingly, using the API definition, communication between the controller and the microservice is implemented without requiring considerable manual efforts and proprietary protocols.

In an example, the method further includes receiving a response from the microservice via the proxy component. The proxy component is configured to translate the response from the first serialization format to the serialized binary format and transmit the response in serialized binary format to the controller. Accordingly, the current disclosure provides for bidirectional communication between the controller and the microservice. In an example, the proxy component is embedded in the controller. Accordingly, this no need for additional hardware for implementation of the above method.

In an example, the data associated with the one or more variables includes a data identifier. The data identifier is for mapping the data to a corresponding response from the microservice. The proxy component is able to track responses to their corresponding communication from the controller on the basis of the data identifiers in the data sent from the controller.

In an example, the one or more data structure types are generated based on an API definition associated with the microservice by a data structure generation module. The data structure generation module acts as an intermediate component for defining the data structure types from the API definition associated with the micro service. Accordingly, inclusion of additional microservices may be done by modifying the data structure generation module and without changing anything on the side of the controller. In an example, the proxy component is configured to receive the one or more data structure types for translating the data from the serialized binary format to a first serialization format. Accordingly, the proxy component is able to data structure types for translation for new microservices that may be added later on.

In another aspect, the current disclosure describes a controller configured to communicate with a microservice in an industrial facility. The controller includes a network interface connected to the microservice via the proxy component, for transmitting data and receiving responses from the microservice, and one or more processors connected to a memory module. The one or more processors are configured to obtain one or more data structure types, wherein the one or more data structure types are generated based on an API definition associated with the microservice, generate one or more variables based on the obtained data structure types, wherein the one or more variables are associated with one or more function blocks of the controller and transmit data associated with the one or more variables to the microservice via a proxy component. The controller transmits the data associated with the one or more variables in a serialized binary format to the proxy component and the proxy component is configured to translate the data from the serialized binary format to a first serialization format and transmit the data in the first serialization format to the microservice.

In another aspect, embodiments provide a non-transitory storage medium configured to communicate with a microservice in an industrial facility. The non-transitory storage medium includes a plurality of instructions that when executed on one or more processors, cause the one or more processors to obtain one or more data structure types, wherein the one or more data structure types are generated based on an API definition associated with the microservice, generate one or more variables based on the obtained data structure types, wherein the one or more variables are associated with one or more function blocks of the controller, and transmit data associated with the one or more variables to the microservice via a proxy component, wherein the controller transmits the data associated with the one or more variables in a serialized binary format to the proxy component, and wherein the proxy component is configured to translate the data from the serialized binary format to a first serialization format and transmit the data in the first serialization format to the microservice. The advantages of the method as applicable to the controller and the non-transitory storage medium mentioned above.

BRIEF DESCRIPTION OF THE FIGURES

FIG. 3 depicts an example API definition for an example microservice according to an embodiment.

DETAILED DESCRIPTION

Figure 1:
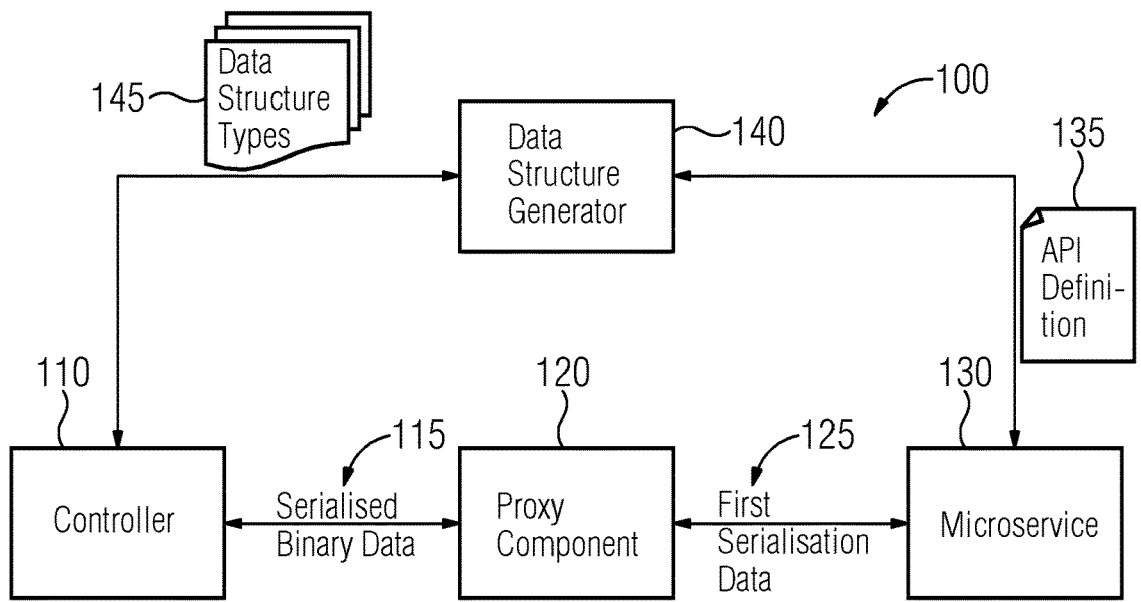
FIG. 1 depicts a controller communicatively coupled to a microservice via a proxy component according to an embodiment.

FIG. 1 depicts an industrial automation system 100 in an industrial facility. Industrial facility herein refers to any environment where one or more industrial processes such as manufacturing, refining, smelting, assembly of equipment may take place and includes process plants, oil refineries, automobile factories, etc. The industrial automation system 100 includes a plurality of control devices such as programmable logic controllers (shown in the figure as controller 110), process controllers, supervisory controllers, operator devices, etc.

The control devices (for example controller 110) are connected to a plurality of field devices such as actuators (not shown in figure) and sensor devices (not shown in figure) for monitoring and controlling industrial processes in the industrial facility. These field devices may include flowmeters, value actuators, temperature sensors, pressure sensors, etc. To enable the control of the industrial processes in the industrial facility, a plurality of control applications are installed on the controllers.

In addition to the control and field devices, the industrial automation system 100 includes one or more enterprise level systems such enterprise resource planning (ERP) servers, manufacturing execution systems, etc. The enterprise level systems include a plurality of enterprise applications that may be realized as microservices in accordance with microservice architecture. Microservice architecture is a variant of the service-oriented architecture that arranges an application as a collection of loosely coupled services. The communication between a service-consumer (client) and a microservice as well as between microservices is realized via an API (application programming interface) that is offered by the microservice to invoke remote procedures (in general called RPC, remote procedure calls) within the microservice in order to transfer data, but also to invoke functionalities (e.g. business rules, functions) that return a result. The most used protocol is HTTP in order to build APIs using approaches like REST or OpenAPI. Most commonly, JavaScript object notation (JSON) format is used for data transmission amongst the microservices and the service-consumers. One such microservice application is shown in the FIG. 1 as microservice 130. However, such protocols and data formats may not be implemented or utilized by the control devices. Accordingly, the industrial automation system 100 includes a proxy component 120 for enabling communication between the control devices and the microservice applications (also referred to as microservices). This is further explained in relation to FIG. 2.

Figure 2:
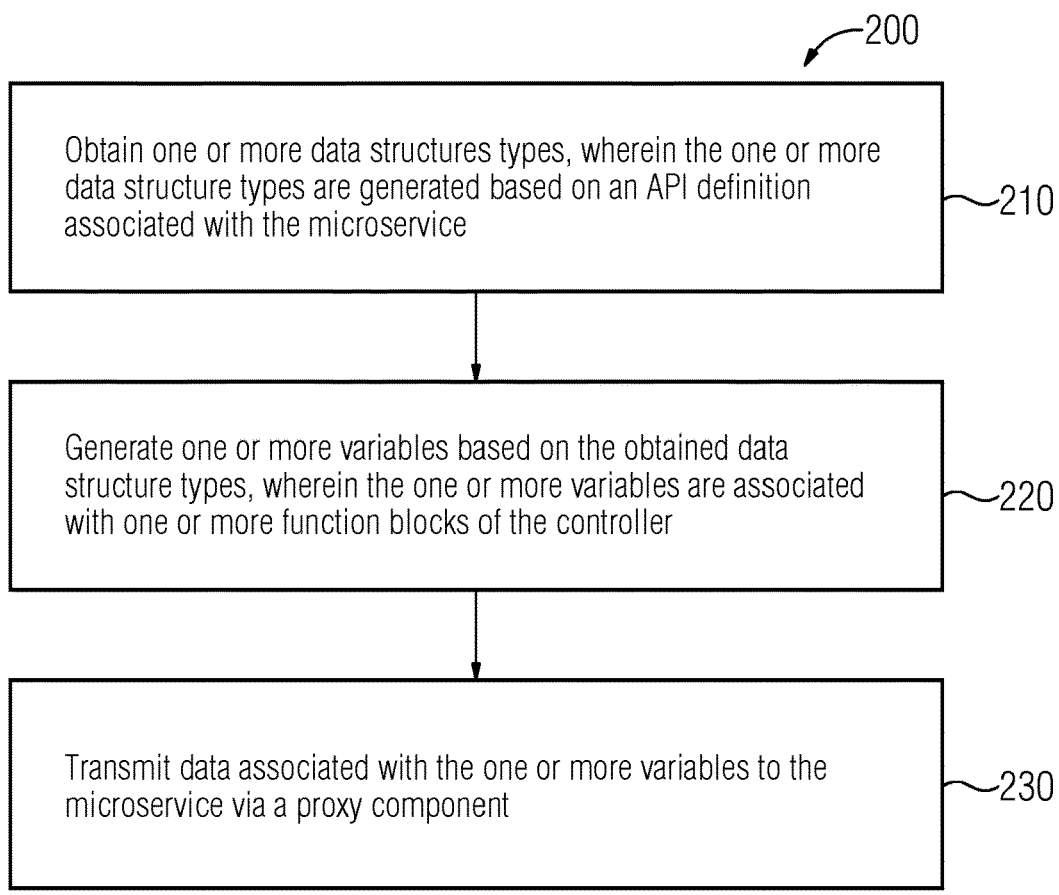
FIG. 2 depicts a method of communicating with a microservice in an industrial facility according to an embodiment.
Figure 4:
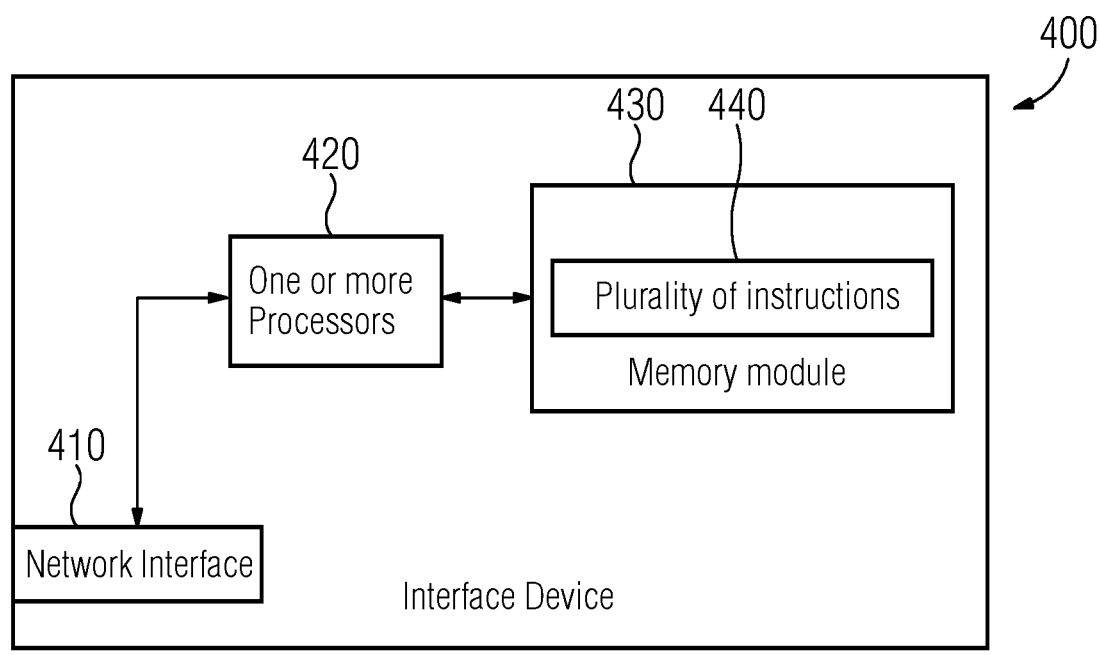
FIG. 4 depicts an example controller configured to communicate with an example microservice via a proxy component according to an embodiment.

FIG. 2 depicts a method 200 of communicating with a microservice 130 in an industrial facility. The method 200 is implemented by the controller 110. At step 210, the controller 110 obtains one or more data structure types 145. The one or more data structure types 145 are generated based on an API definition 135 associated with the microservice 130. The one or more data structures are generated by a data structure generator or data structure generation module 140. The data structure generation module 140 is configured to receive the API definition 135 associated with the microservice 130. The API definition 135 is a standard, language-agnostic interface to microservice enabling service consumers to discover and understand the capabilities of the microservice 130. An example API definition 300 is shown in FIG. 3. As shown in FIG. 3, the API definition 300 defines a function 'Arithmetics' that takes two variables 'x' and 'y' of the type 'number' (also referred to as request) and performs an arithmetic operation on them. Additionally, the response from the function 'Arithmetics' is an object of the type 'number' that is the result of the arithmetic operation. Accordingly, based on the example API definition 300, the data structure generation module 140 defines the one or more data structure types 145. For example, based on the API definition 300, the data structure generation module 140 defines a number type data structure for the request i.e. the variables 'x', 'y' and the response. The generated data structure types are then transmitted to the controller 110.

At steps 220, the controller 110 generates one or more variables based on the obtained data structure types. The one or more variables are associated with one or more function blocks of the controller. The variables are associated with the request and response of the microservice and used in the logic statements used in the function blocks defined for the control application within the controller. For example, based on the API definition 300 and the corresponding data structure types 145, the controller 140 creates three variables of the type 'number' or an equivalent data format in the controller memory. The first two variables correspond to 'x' and 'y' variables as specified in the API definition 300. These two variables may be associated with one or more outputs from one or more function blocks executed in the controller. The first two variables are subsequently used to invoke the microservice 130. Similarly, the third variable corresponds to the response received from the microservice 130.

At step 230, the controller 140 invokes the microservice 130 by transmitting data (shown in the figure as serialized binary data 115) associated with the one or more variables to the microservice 130 via a proxy component 120. The controller 140 transmits the data associated with the one or more variables in a serialized binary format to the proxy component 120. Continuing the above example, the controller transmits the first two variables (i.e. 'x' and 'y') to the microservice 130 (via the proxy component 120 as explained below) for the performing the arithmetic operation. However, since the microservice 130 is not configured to receive serialized binary data, the controller 140 transmits the serialized data to the proxy component 120.

The proxy component 120 is configured to translate the data from the serialized binary format to a first serialization format and transmit the data in the first serialization format (shown in the figure as first serialization data 125) to the microservice 130. In an example, the proxy component 120 is configured to receive the data structure types 145 from the data structure generation module 140 prior to the translation of the data from the serialized binary format. Accordingly, based on the received one or more data structure types 145, the proxy component 120 translates the data from the serialized binary format to the first serialization format. In an example first serialization format is a JSON format.

In an example, the method 200 further includes receiving a response from the microservice via the proxy component, wherein the proxy component is configured to translate the response from the first serialization format to the serialized binary format and transmit the response in serialized binary format to the controller. Accordingly, subsequent of the invocation of the microservice 140 based on the received data of the variables, the microservice 140 performs the arithmetic operation on the data of the variables and sends the resultant of the operation as the response in the first serialization format, that is then translated to the serialized binary data by the proxy component 120 that then transmits the same to the controller 110.

In an example, the data associated with the one or more variables includes a data identifier, wherein the data identifier is for mapping the data to a corresponding response from the microservice. For example, the proxy component 120 includes a mapping table includes entries of data (also referred to as requests) from controller 140 against the corresponding data identifier. The microservice sends the response with the corresponding data identifier to the proxy component 120 and accordingly, based on the data identifier the proxy component I able to map the response to the data from the controller.

While the data structure generation module 140 and the proxy component 120 are depicted as independent components, they may be combined with either the microservice or the controller or a single device that includes both the data structure generation module 140 and the proxy component 120. For example, the proxy component 120 is embedded in the controller 140.

In another aspect, the current disclosure describes an example controller 400 configured to communicate with a microservice 130 in an industrial facility. The controller 400 includes a network interface 410 connected to the microservice 130 via the proxy component 120, for transmitting data and receiving responses from the microservice 130 and one or more processors 420 connected to a memory module 430. The memory module 430 (also referred to as non-transitory storage medium 430) includes a plurality of instructions 440 that when executed on the one or more processors 420, causes the one or more processors 420 to obtain one or more data structure types, wherein the one or more data structure types are generated based on an API definition associated with the microservice, generate one or more variables based on the obtained data structure types, wherein the one or more variables are associated with one or more function blocks of the controller, and transmit data associated with the one or more variables to the microservice via a proxy component, wherein the controller transmits the data associated with the one or more variables in a serialized binary format to the proxy component, and wherein the proxy component is configured to translate the data from the serialized binary format to a first serialization format and transmit the data in the first serialization format to the microservice.

For the purpose of this description, a computer-usable or computer-readable non-transitory storage medium may be any apparatus that may contain, store, communicate, propagate, or transport the program for use by or in connection with the instruction execution system, apparatus, or device. The medium may be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processing units and program code for implementing each aspect of the technology may be centralized or distributed (or a combination thereof) as known to those skilled in the art.

It is to be understood that the elements and features recited in the appended claims may be combined in different ways to produce new claims that likewise fall within the scope of the present embodiments. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present embodiments have been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method of communicating with a microservice in an industrial facility, the method comprising:
 obtaining, by a controller, one or more data structure types, wherein the one or more data structure types are generated based on an API definition associated with the microservice, wherein an API is offered by the microservice to invoke remote procedures within the microservice to transfer data and to invoke functionalities that return a result;
 generating, by the controller, one or more variables based on the obtained data structure types, wherein the one or more variables are associated with one or more function blocks of the controller; and
 transmitting, by the controller, data associated with the one or more variables to the microservice via a proxy component, wherein the controller transmits the data associated with the one or more variables in a serialized binary format to the proxy component, and wherein the proxy component is configured to translate the data from the serialized binary format to a first serialization format and transmit the data in the first serialization format to the microservice;
 wherein the proxy component translates the data from the serialized binary format to a first serialization format, based on the one or more data structure types and wherein the translation is enabled via the API definition of the microservice which is used by the controller to generate variables.

2. The method of claim 1, wherein the method further comprises receiving a response from the microservice via the proxy component, wherein the proxy component is configured to translate the response from the first serialization format to the serialized binary format and transmit the response in serialized binary format to the controller.

3. The method of claim 1, wherein the proxy component is embedded in the controller.

4. The method of claim 1, wherein the data associated with the one or more variables includes a data identifier, wherein the data identifier is for mapping the data to a corresponding response from the microservice.

5. The method of claim 1, wherein the one or more data structure types are generated based on the API definition associated with the microservice by a data structure generation module.

6. A controller configured to communicate with a microservice in an industrial facility, the controller, comprising:
 a network interface connected to the microservice via a proxy component, for transmitting data and receiving responses from the microservice (130); and
 one or more processors connected to a memory module, the one or more processors configured to:
 obtain one or more data structure types, wherein the one or more data structure types are generated based on an API definition associated with the microservice; wherein an API is offered by the microservice to invoke remote procedures within the microservice to transfer data and to invoke functionalities that return a result,
 generate one or more variables based on the obtained data structure types, wherein the one or more variables are associated with one or more function blocks of the controller; and
 transmit data associated with the one or more variables to the microservice via a proxy component, wherein the controller transmits the data associated with the one or more variables in a serialized binary format to the proxy component, and wherein the proxy component is configured to translate the data from the serialized binary format to a first serialization format and transmit the data in the first serialization format to the microservice,
 wherein the proxy component translates the data from the serialized binary format to a first serialization format, based on the one or more data structure types and wherein the translation is enabled via the API definition of the microservice which is used by the controller to generate variables.

7. A non-transitory storage medium configured to communicate with a microservice in an industrial facility, the non-transitory storage medium comprising a plurality of instructions which when executed on one or more processors, cause the one or more processors:
 obtain, by a controller, one or more data structure types, wherein the one or more data structure types are generated based on an API definition associated with the microservice; wherein the API is offered by the microservice to invoke remote procedures within the microservice to transfer data and to invoke functionalities that return a result,
 generate, by the controller, one or more variables based on the obtained data structure types, wherein the one or more variables are associated with one or more function blocks of the controller; and
 transmit, by the controller, data associated with the one or more variables to the microservice via a proxy component, wherein the controller transmits the data associated with the one or more variables in a serialized binary format to the proxy component, and wherein the proxy component is configured to translate the data from the serialized binary format to a first serialization format and transmit the data in the first serialization format to the microservice, wherein the proxy component translates the data from the serialized binary format to a first serialization format, based on the one or more data structure types and wherein the translation is enabled via the API definition of the microservice which is used by the controller to generate variables.

* * * * *